United States Patent [19]

Keesen et al.

[11] Patent Number: 4,807,033
[45] Date of Patent: Feb. 21, 1989

[54] METHOD FOR CORRECTING TELEVISION SIGNALS

[75] Inventors: Werner Keesen, Hanover; Wolfgang Hartnack, Hemmingen; Dietrich Westerkamp, Hanover, all of Fed. Rep. of Germany

[73] Assignee: Deutsche Thomson-Brandt GmbH, Villingen-Schwenningen, Fed. Rep. of Germany

[21] Appl. No.: 914,732

[22] Filed: Oct. 1, 1986

[30] Foreign Application Priority Data

Oct. 2, 1985 [DE] Fed. Rep. of Germany ....... 3535178
Mar. 18, 1986 [DE] Fed. Rep. of Germany ....... 3608917

[51] Int. Cl.⁴ .................... H04N 7/13; H04N 7/133
[52] U.S. Cl. ................................ 358/167; 358/166; 358/133; 358/105; 358/138; 358/36; 358/37

[58] Field of Search .............. 358/105, 133, 135, 136, 358/138, 166, 167, 36, 37

[56] References Cited

U.S. PATENT DOCUMENTS

| 4,245,248 | 1/1981 | Netrauali ........................... 358/105 |
| 4,639,784 | 1/1987 | Fling ................................. 358/166 |
| 4,656,514 | 4/1987 | Wilkinson ......................... 358/167 |
| 4,704,628 | 11/1987 | Chen ................................ 358/136 |

Primary Examiner—Howard W. Britton
Attorney, Agent, or Firm—Spencer & Frank

[57] ABSTRACT

Method of correcting television signals transmitted in blocks, including detecting defective blocks with an error detection circuit and calculating substitute information for a block determined to be defective from an environment of the defective block or from a television signal preceding in time the signal containing the defective block.

18 Claims, 12 Drawing Sheets

Fig.1

(PRIOR ART)

METHOD FOR CORRECTING TELEVISION SIGNALS

BACKGROUND OF THE INVENTION

The present invention relates to a correction method for correcting television signals transmitted in blocks by detecting a defective block with the use of an error detection circuit and reducing the effect of errors in the defective block with an error concealment circuit which is activated by the error detection circuit when a defective block is detected.

The article entitled, "Channel Error Recovery for Transform Image Coding" in *IEEE Transactions on Communications.* Vol. COM-29, No. 12, December 1981, introduces an error reduction method of two-dimensional transform image coding. Arbitrarily or systematically selected television picture sections are identified as blocks. Before transmission, the blocks are transformed into spectral blocks and coded. After transmission, spectral blocks are decoded and retransformed. Defective blocks are detected and corrected by utilizing the natural redundance in a television picture. Natural redundance results from the fact that generally a block does not have greater changes in brightness and/or color at its interfaces with all adjacent blocks. If, in the decoded signal which serves as a measure for the brightness and/or color of the picture content, greater changes in brightness and color exist at all edges of a block, this indicates a transmission error and correction information can be calculated from the differences at the block interfaces and used to subsequently correct the block.

SUMMARY OF THE INVENTION

It is an object of the invention to provide a method which corrects, with simple and effective measures, blocks and/or spectral blocks which have been detected to be defective.

The above and other objects of the invention are accomplished in the context of a correction method of the type described above wherein the step of reducing the effect of errors in a defective block includes calculating, for a block detected to be defective, substitute information obtained from an environment of the defective block or from a television signal preceding in time the signal containing the defective block; and replacing the defective block with the substitute information.

For a better understanding of the invention, the method according to the invention will be described in greater detail below with reference to the accompanying drawing Figures.

DESCRIPTION OF THE PREFERRED EMBODIMENTS

Figure 1:
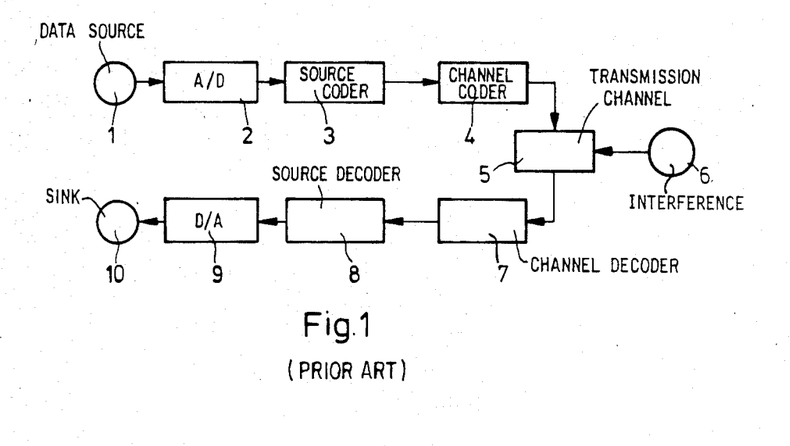
FIG. 1 is a block circuit diagram showing a known data transmission system.

In FIG. 1 there is shown a data source 1 which emits electrical signals to an analog/digital (A/D) converter 2. Digitalized signals travel from A/D 2 to source coder 3 which codes the signals. The coded signals are transmitted by channel coder 4, which provides the signals with redundance, through a transmission channel 5 to a channel decoder 7. Transmission channel 5 is influenced by interference 6. Channel decoder 7 transfers the interfered-with signals to a source decoder 8 where they are decoded. The decoded signals are converted to analog form in a digital/analog (A/D) converter 9. The analog signals are fed to sink 10. Such a system is disclosed, for example, in the dissertation entitled, "Adaptive Transformationscodierung von digitalisierten Bildsignalen" [Adaptive Transformation Coding of Digitalized Video Signals] by W. Mauersberger given July 4th, 1980, at the Technical University Aachen, Federal Republic of Germany. This system is also applicable to a video recorder which stores data in blocks on a magnetic tape, and which channel and source decodes them for video and/or audio playback. In channel coder 4, the digital signals to be transmitted are provided with parity bits which permit a first error correction in channel decoder 7. With the aid of the parity bits, channel decoder 7 detects simple errors and corrects them. Difficult errors, however, produce defective blocks, and are not detected or can no longer be corrected.

Figure 2:
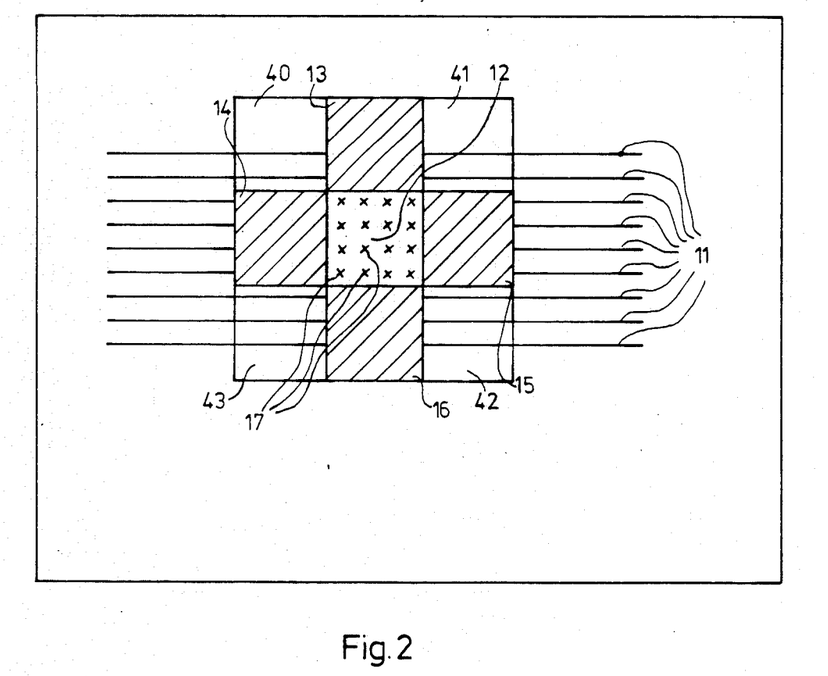
FIG. 2 is a diagram showing a television frame which is divided into blocks.

FIG. 2 shows a television frame with lines 11 and blocks 13 to 16 and 40 to 43 surrounding an interfered-with block 12 composed of 4×4 pixels 17 disposed at its interior.

A first method of replacing a defective block involves calculating, for each pixel 17 of block 12, the arithmetic mean of the pixels of neighboring blocks 13 to 16 which are immediately adjacent block 12.

Figure 3:
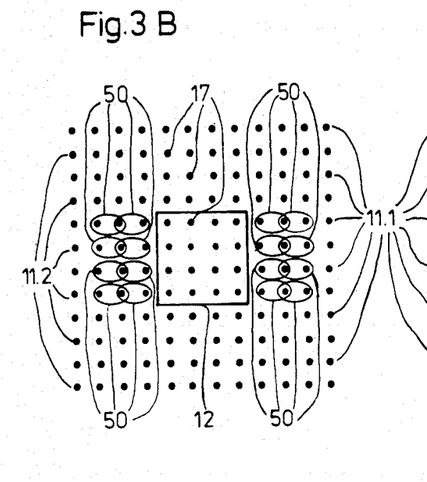
FIGS. 3A to 3E are diagrams showing blocks of pixels with chromaticity or gray values to be calculated.
Figure 3A:
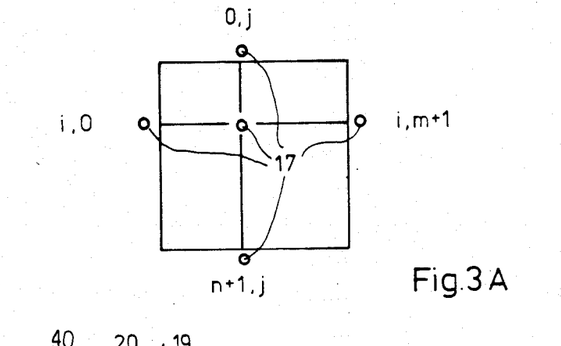

FIG. 3A illustrates a second method of replacing a defective block which includes calculating the gray or chromaticity value x(i,j) for each pixel 17 from the gray or chromaticity values x(0,j) x(i,0), x(i,m+1) and x(n+1,j) of the orthogonally adjacent pixels 17 of neighboring blocks 13 to 16. The formula for the gray or chromaticity value (x) of a pixel 17, hereinafter also called bilinear interpolation, is as follows:

$$x(i,j) = \frac{n-i}{2n} * x(0,j) + \frac{m-j}{2m} * x(i,0) + \frac{j-1}{2m} * x(i,m+1) + \frac{i-1}{2n} * x(n+1,j)$$

The indices i and j characterize the position in the block 12, i characterizes the line and j the column. The indices n and m characterize the size of a block 12, n characterizes the vertical and m the horizontal length.

If the defective block has a directional structure, e.g. a horizontal line, this interpolation is unsatisfactory. Therefore, it is appropriate to detect whether a directional structure (horizontal, vertical, diagonally ascending, diagonally descending) is present and in this case to use only the corresponding, suitable edge pixels for the interpolation.

Therefore, the above general interpolation formula should be used only if no sufficiently clear structural direction can be detected.

FIG. 3B illustrates a structure detection technique for the horizontal direction. The pixels 17 of a first field having lines 11.1 and a second field having lines 11.2 are shown on a monitor. A block 12 in the center contains 4 * 4 pixels. The pixels 17 of block 12 are surrounded by further pixels 17 in ellipses 50. The gray or chromaticity values of the two pixels 17 in each ellipse 50 are subtracted from one another and the absolute values of the differences are added to form a sum. If in one or several ellipses 50 a sudden change in gray or chromaticity value has occurred in the vertical, diagonal or oblique direction (all directions except for the horizontal direction), the difference between the gray or chromaticity values of two pixels is great and the sum of the differences is even greater. If the sum is small however, no sudden change in the vertical, diagonal or oblique direction has occurred. From this extreme value determination with a minimum, a conclusion can be drawn to the horizontal structure direction within a block.

FIG. 3C illustrates a structure detection technique for the vertical direction. Pixels 17 of a first field having lines 11.1 and of a second field having lines 11.2 are shown on a monitor. Block 12 again contains 4 * 4 pixels 17. Since a frame is composed of two fields having lines 11.1 and 11.2, the gray or chromaticity values for the vertical direction are considered not of adjacent pixels but of pixels 17 which are separated from one another by a pixel of the other field. The pixels whose chromaticity or gray values are subtracted from one another are connected by arcs 51 to 54, with pixels 17 of arcs 51 and 54 belonging to lines 11.1 of a first field and the pixels 17 of arcs 52 and 54 belonging to lines 11.2 of a second field. If sudden changes in chromaticity or gray value have occurred, a structure exists in the horizontal, diagonal or oblique direction (except for the vertical direction). If there are no sudden changes in chromaticity or gray value, the sum of the differences is low and a conclusion can be drawn that a vertical structure exists in block 12. This corresponds to extreme value determination with a minimum.

FIG. 3D illustrates a structure detection technique in a first diagonal direction, hereinafter also called the diagonally ascending direction. For this purpose, the pixels 17 surrounding the pixels belonging to block 12 are observed in the diagonal direction. Since here again, two fields 11.1 and 11.2 are involved, it is necessary not to consider chromaticity or gray values of diagonally adjacent pixels 17 but only the chromaticity or gray values of pixels 17 which are separated from one another by a second pixel 17 of the other field. The pixels whose chromaticity or gray values are subtracted from one another are connected by arcs 55 to 58, with pixels 17 of arcs 56 and 58 belonging to the lines of a first field and pixels 17 of arcs 55 and 57 belonging to the lines of a second field. If sudden changes in chromaticity or gray value have occurred, a structure is present in a horizontal or vertical direction (except for the first diagonal direction). If there are no sudden changes in chromaticity or gray value, the sum of the differences is small and a conclusion can be drawn that a first diagonal structure exists in block 12. This corresponds to extreme value determination with a minimum.

FIG. 3E illustrates a structure detection technique in the diagonal direction opposite to that of FIG. 3D and perpendicular to the first diagonal direction, hereinafter called the second diagonal, or diagonally descending direction. As in FIG. 3D, the chromaticity or gray values are being considered for pixels 17 which are separated from one another by a second pixel 17 of a field disposed therebetween. Pixels 17 whose chromaticity or gray values are subtracted from one another are connected by arcs 59 to 62, with pixels 17 of arcs 59 and 61 belonging to the lines of a first field and pixels 17 of arcs 60 and 62 belonging to the lines of a second field. If there are sudden changes in chromaticity or gray value, a structure exists in a horizontal or vertical direction (except for the second diagonal direction). If there is no sudden change in chromaticity or gray value, the added sum of the differences is small and a conclusion can be drawn that a second diagonal structure exists in block 12. This corresponds to extreme value determination with a minimum.

The diagonal structure detection signals may also be determined as follows:

For the diagonally ascending direction STH, the differences LUH (bottom left) and ROH (top right) in chromaticity or gray values of the pixels 17 of block 12 (FIG. 2) are summed up separately.

Instead of

STH=LUH+ROH, one calculates

STH=2 * (LUH * ROH)exp ½.

In both cases, the same STH is obtained for LUH=-ROH, i.e. if the same structural direction exists at the bottom left and top right. If either LUH or ROH is small, i.e. 0, STH becomes noticeably smaller or 0, respectively.

Accordingly, instead of FAH=LOH+RUH, one calculates

FAH=2 * (LOH * RUH)exp ½.

First, the minimum MINRDH is determined for the four directions WA (horizontal), SE (vertical), ST (ascending) and FA descending). LOH means top left, RUH bottom right.

MINRDH=min (WAH, SEH, STH, FAH)

where H=1 for the first field and H=2 for the second field. If the three other ones of these four output signals are greater than or equal to 1.4 * MINRDH, it is assumed that an unequivocal structural direction exists and interpolation matching MINRDH is performed.

If two adjacent direction detector output signals (WAH/STH or WAH/FAH or SEH/STH or SEG/FAH) are less than, for example, 1.4 * MINRDH, it can be assumed that the structural direction in the block under consideration lies between the directions of these two values. In this case, it is appropriate to use the arithmetic mean of the two interpolations as a substitute signal for the defective block, e.g.

$$xH(i,j)=[xH(WA)(i,j)+xH(ST)(i,j)] / 2.$$

If no directional structure can be detected, but the sum of the output signals of the direction detectors exceeds a threshold value, it can be assumed that a non-directional structure exists at the location of the defective block. In this case, a random number image pattern can be superposed on the general interpolation.

A third method of replacing a defective block 12 includes using the information of the geometrically identical block of the full video frame preceding in time the defective block.

Figure 4:
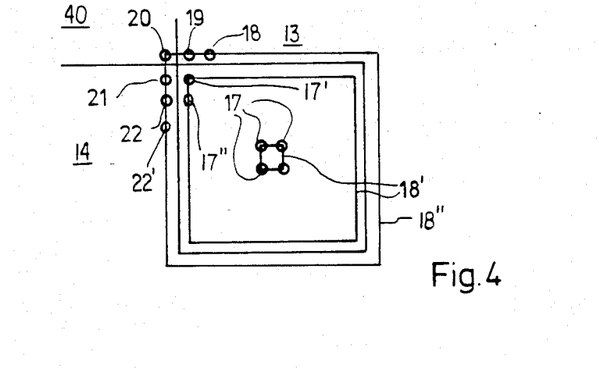
FIG. 4 is a diagram showing a further block with pixels.

FIG. 4 shows a corner pixel 17' whose gray or chromaticity value is determined by or calculated from the gray or chromaticity value of the five adjacent outer pixels 18 to 22 of blocks 13, 14 and 40. The gray or chromatically values of all other pixels, except for corner pixels, are calculated or determined by the gray or chromatically values of three adjacent pixels. The three adjacent pixels always lie on an outer ring 18". The calculation is effected in a ring or recursively, with rings 18' and 18" continuously decreasing in size. The gray or chromatically value of the corner pixel 17' is one fifth total of the gray or chromatically values of the outer pixels 18-22. The gray or chromatically value of the pixel 17" is one third total of the gray or chromaticity values of the outer pixels 21, 22 and 22'.

Figure 5:
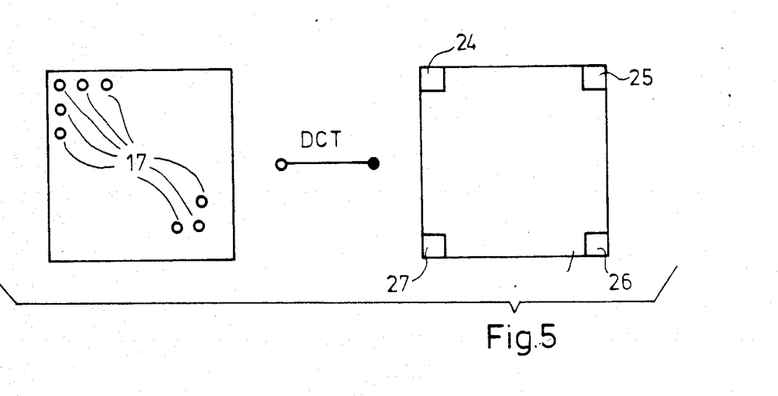
FIG. 5 is a diagram showing a block with pixels and its transformation into a spectral block.

FIG. 5 shows a block having 8×8 pixels whose threshold value signals are imaged in a spectral block by way of a discrete cosine transformation (DCT). At its corners 24 to 27, the spectral block has spectral coefficients which are a measure 24 of the DC component, a measure 25 of the highest vertical frequency component, a measure 26 of the highest diagonal frequency component and a measure 27 of the highest horizontal frequency component.

Figure 6:
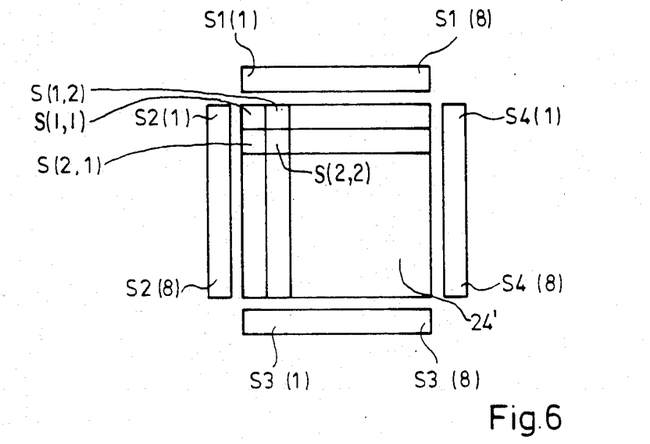
FIG. 6 is a diagram of a spectral block.

FIG. 6 shows a spectral block 24' with estimated spectral coefficients S (1,1), S (1,2), S (2,1), S (2,2), S (3,1), ... S (8,2), S (1,3), S (2,3), S (1,4), ... S (2,8). Spectral block 24' belongs to a defective block 12. One-dimensional transformations having spectral coefficients S1 (1), ... S1 (8), S2 (1), ... S2 (8), S3 (1), ... S3 (8), S4 (1), ... S4 (8) are calculated from adjacent pixels of neighboring blocks 13 to 16. From these spectral coefficients, the spectral coefficients of the defective block can be estimated:

$$S(1,j)=S1(j)+S3(j)) * 2 \exp \tfrac{1}{2}, j=2\ldots 8$$

$$S(2,j)=(S1(j)-S3(j)) * 2 \exp \tfrac{1}{2}, j=3\ldots 8$$

$$S(i,j)=(S2(i)+S3(i)) * 2 \exp \tfrac{1}{2}, i=2\ldots 8$$

$$S(i,2)=(S2(i)-S3(i)) * 2 \exp \tfrac{1}{2}, i=3\ldots 8$$

$$S(1,1)=(S1(1)+S3(1)+S2(1)+S4(1)) * \tfrac{1}{2} \exp \tfrac{1}{2}$$

$$S(2,2)=(S1(1)-S3(1)+S2(1)-S4(1)) * \tfrac{1}{2} \exp \tfrac{1}{2}$$

The matrix or block length is 8 pixels. The one-dimensional transformation results in a matrix size of 1×8. The transformation into the one-dimensional matrix and the retransformation of the spectral block into a block are of the same type, for example, DCT and inverse DCT. If several adjacent blocks are interfered with, an average gray or chromaticity value is inserted at the locations where the blocks meet. The error detection circuits 26 can be formed by one or a few ICs CRC Generator/Checker 9401 Fairchild TTL Macrologic, See Fairchild, Bipolar Microprocessor Databook, Macrologic from 1977 of the firm Fairchild, 464 Ellis Street, Moutain View, Calif. 94042. FIGS. 11-16 show hardware to implement DCT Circuits 31 and inverse DCT circuits 35. For one-dimensional transformation the hardware shown in FIGS. 11-16 is needed once, for two dimensional transformation the hardware is needed twice, serial or parallel. In practice the hardware is needed ten times to transform the borders of the neighbouring blocks 13-16 of block 12. The different coefficients of transformation and inverse transformation are stored in ROMs (Read only memory) 87 S 421, see Interface / Bipolar LSI / Bipolar Memory / Programmable Logic Databook of National Semiconductor Corporation, edition 1983. FIGS. 11-16 viewed from FIG. 11 (top) to FIG. 16 (bottom) together show a single circuit which depicts hardware components. The formula for a one- and a two-dimensional transformation are as follows:

$$-QE- = -T- * -E-$$

and $$-QE- = -T- * -E- * -T-$$

-QE- is the matrix of transformed digital video signals, i.e. transformed digital gray or chromaticity values.
-T- is the transformations matrix, i.e. DCT, with transformation coefficients.
-E- is the matrix of digital video signals, i.e. of digital gray or chromaticity values.

The formula for a two-dimensional retransformation is as follows:

$$-A- = -TI- * -KA- * -TI-$$

-A- is the matrix of retransformed digital video signals.
-TI- is the retransformation matrix
-KA- is the matrix of transformed digital video signals.
-QE- is the matrix of transformed digital video signals before passing the transmission channel 5 and after passing the channel and after the interference 6 -QE- has changed to -KA-. S1(1), ... , S4(8) are one-dimensional spectral coefficients of -QE-, S(1,1), ..., S(8,8) are two-dimensional spectral coefficients of -QE-.

The estimation of the spectral values for block 24' (FIG. 6) can be improved by not using a 1×8 transformation from the neighboring blocks but by using instead, for example, a 2×8 transformation. With directional image contents, for example, lines, it is possible to learn from the 2×8 spectral values whether or not these lines intersect the borders of the block at an angle of approximately 90° and thus are continued in the block in a logical manner compared to the opposite block. In the case of a 90° angle, all values of the second line equal zero in a 2×8 spectral block.

The estimation of the spectral values in block 24' (FIG. 6) can also be expanded to all 8×8=64 values if it is appropriate to make the respective estimation from all four block edges.

The estimated spectral value (i,j) results as follows (See FIGS. 3 and 6):

$$S(i,j)=[\pm C / (\min(x,y)-1)] * (S1(1,j)\pm S3(1,j) * (S2(1,i)+S4(1,i)] \exp \tfrac{1}{2}$$

where:
C=constant factor, i and j are greater than 1,
and the following combinations are used in the above formula:

if i is even: S1(1,j)−S3(1,j)
if i is odd: S1(1,j)+S3(1,j)
if j is even: S2(1,i)−S4(1,i)
if j is odd: S2(1,i)+S2(1,i)
if S1±S3 >0 and S2±S4 >0: +C
if S2±S3 <0 and S2±S4 <0: −C If an adjacent block (13, 14, 15, 16, 40-43 in FIG. 2) is likewise defective, it is generally better, instead of using an average gray or chromaticity value at the respective edge, to take the respective edge from block 12 (FIG. 2) of the preceding frame or to take the already interpolated edge block from the current frame.

If the picture content does not move between the block under consideration in the current frame and the corresponding block in the preceding frame, it is more appropriate here to use the geometrically identical block from the preceding frame. This decision is made with the aid of the output signal of a motion detector according to the characteristic curve shown in FIG. 8.

Figure 8:
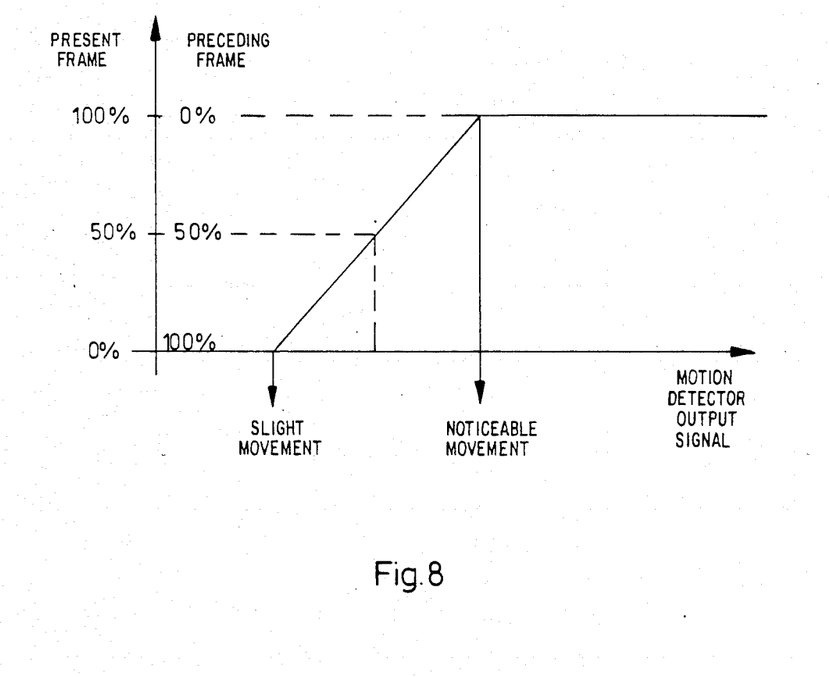
FIG. 8 is a diagram showing the characteristics of a motion detector.

In the range between slight movement ($\approx$1 pixel/field) and distinct movement ($\approx$2 pixels/field), the spectral values calculated from the bilinear interpolation or the retransformed spectral values and the picture values from the preceding frame are mixed according to percentages as shown by the vertical axis in FIG. 8.

The motion detector may receive, for example, the following signals for evaluation:

the sum of the amounts of the pixel differences between the outer edge of the block in the current frame and in the preceding frame;

the sum of the amounts of the 1×8 spectral value differences of the edges, where the sign changes between the current frame and the preceding frame and a given threshold is exceeded;

the sum of the amounts of the 1×8 average value differences of the edges between the current and the preceding frame.

Figure 7:
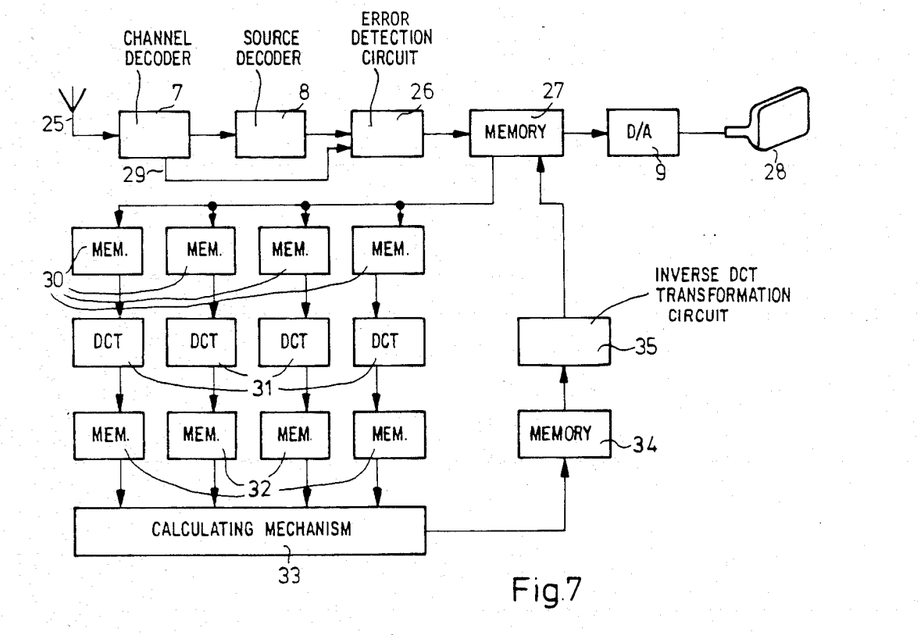
FIG. 7 is a block circuit diagram of a receiver with block correction circuitry for implementing the method according to the invention.

FIG. 7 shows an antenna 25, a channel decoder 7 and a source decoder 8, an error detection circuit 26, a memory 27 for at least three rows of blocks, a D/A [digital/analog converter] 9 and a monitor 28. The error detection circuit 26 detects errors and actuates an error concealment circuit. In addition, error detection circuit 26 is informed by channel decoder 7, via a line 29, about irreparable spectral blocks. Error detection circuit 26 may also be integrated in source decoder 8. The error concealment circuit is composed of a memory 27, four intermediate memories 30, which store the gray or chromaticity values of adjacent pixels, four DCT circuits 31, which perform a one-dimensional transformation, four intermediate memories 32, which intermediately store the spectral coefficients S1 (1), . . . , S1 (8), . . . , S2 (1), . . . , S2 (8), S3 (1), . . . , S3 (8), S4 (1), . . . , S4 (8), a calculating mechanism 33 for calculating the spectral coefficients S (1,1), . . . , S (2,8), . . . , S (8,2) for the block to be replaced, an intermediate coefficient memory 34 and a circuit 35 for the inverse DCT transformation. Circuit 35 generates a block which is stored in memory 27 instead of the defective block. Since the DCT circuits are rather complicated, it is recommended to employ serial processing in multiplex operation with a DCT circuit 31 rather than parallel operation.

Figure 9:
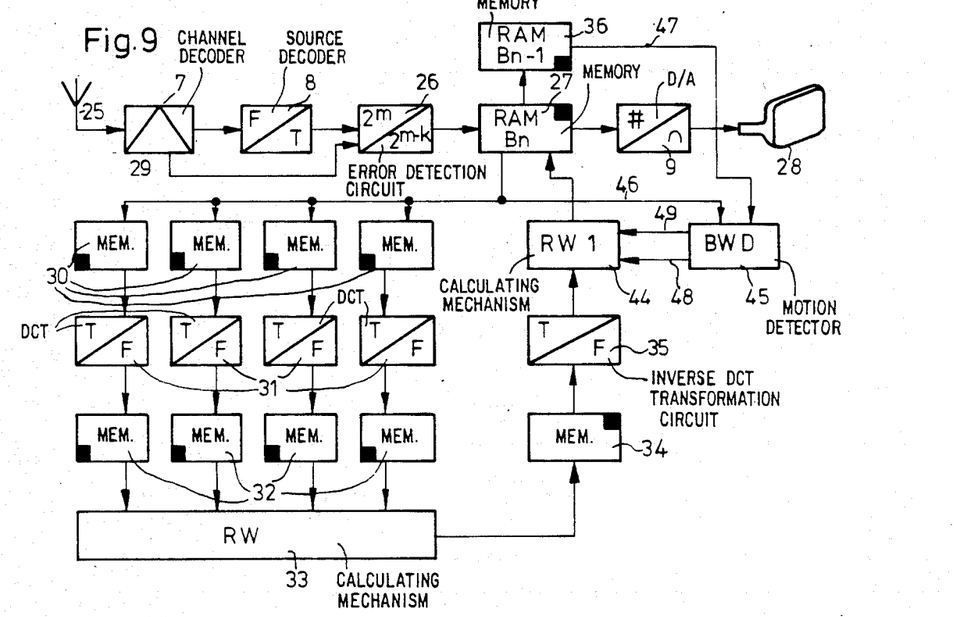
FIG. 9 is a block circuit diagram of another receiver incorporating further block correction circuitry for implementing the method according to the invention.

FIG. 9 show a further receiver having improved block correction. The error concealment circuit includes an intermediate memory 27, four intermediate memories 30, four DCT circuits 31, four intermediate memories 32, calculating mechanism 33, intermediate memory 34, a circuit 35 for inverse DCT transformation, an intermediate memory 36, a calculating mechanism 44 and a motion detector 45. Intermediate memory 36 stores chromaticity or gray values of one row of blocks and the four lines above it as well as the four lines adjacent thereto at the bottom from the frame preceding in time. The four intermediate memories 30 store the gray or chromaticity values of adjacent pixels. The four DCT circuits 31 perform a 2*8 transformation or interpolate gray or chromaticity values in four different directions. The four intermediate memories 32 store the spectral coefficients S1 (1,1) . . . , S4(8,2) or the differently directed interpolations of the gray or chromaticity values. Calculating mechanism 3 calculates the spectral coefficients S(1,1), . . . , S (2,8), . . . , S (8,8) or the most probable structural direction of the gray or chromaticity values for the block to be replaced with the corresponding interpolation. Intermediate memory 34 stores either spectral coefficients, or gray or chromaticity values. Circuit 35 performs an inverse DCT transformation for the case of spectral value estimation. Intermediate memory 27 sends signals for the gray or chromaticity values via line 46 to intermediate memories 30 and motion detector 45 and, via a further line, to intermediate memory 36. Intermediate memory 36 stores the gray or chromaticity values of the preceding frame Bn-1 and feeds these via line 47 to motion detector 45. The motion detector compares the current frame Bn with the preceding frame Bn-1 and sends a signal via line 49 to calculating mechanism 44. The signal is a binary word and serves as a measure of the motion of the content of successive frames Bn and Bn-1. Calculating mechanism 44 generates a block which is stored in memory 27 instead of defective block 12. In calculating mechanism 44, one or a few blocks are combined in appropriate percentages from the estimated block content of the current frame and from the block content of the preceding frame according to the function shown in FIG. 8. Inverse DCT transformation circuit 35 sends the estimated block content of the current frame via a line to calculating mechanism 44, and motion detector 45 sends the block content of the preceding frame via a line 48 to calculating mechanism 44. Calculating mechanism 44 is formed of one or a plurality of adders of the Fairchild 74F382 type, one or a plurality of registers of the Fairchild 74F374 type and a ROM for a look-up table as furnished by National Semiconductor, type 87S421, 4K×8 ROM. The term Look-up table means that for a given value, a memory furnishes an associated value.

If the circuit is used to detect weighted structures, DCT circuits 31 are replaced by four structure detectors and interpolation circuits 31. Calculating mechanism 33 detects the existing minimum and adds, if required, percentages of adjacent interpolation values. If no directional structure can be detected, but the sum of the output signals of the direction detectors exceeds a threshold value, calculating mechanism 33 operates as a random number generator and superposes an artificially generated structure on the calculated interpolation. In this embodiment circuit 35 is omitted and intermediate memory 34 gives its data directly via a line to calculating mechanism 44.

According to a further alternative embodiment, spectral values are stored in memories 27 or 36, since the one-dimensional or 2*8 spectral values of the block edges can be calculated from the two-dimensional (8*8) spectral values of the adjacent blocks. Circuit 35 (inverse DCT) is then omitted. Circuits 31 are simplified; and source decoder 8 is disposed between memory 27 and D/A 9.

Figure 10:
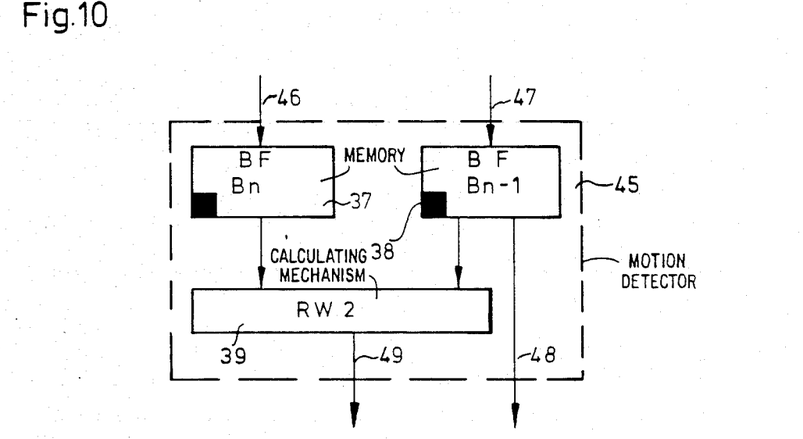
FIG. 10 is a block circuit diagram of a motion detector which can be used to implement the method according to the invention.
Figure 11:
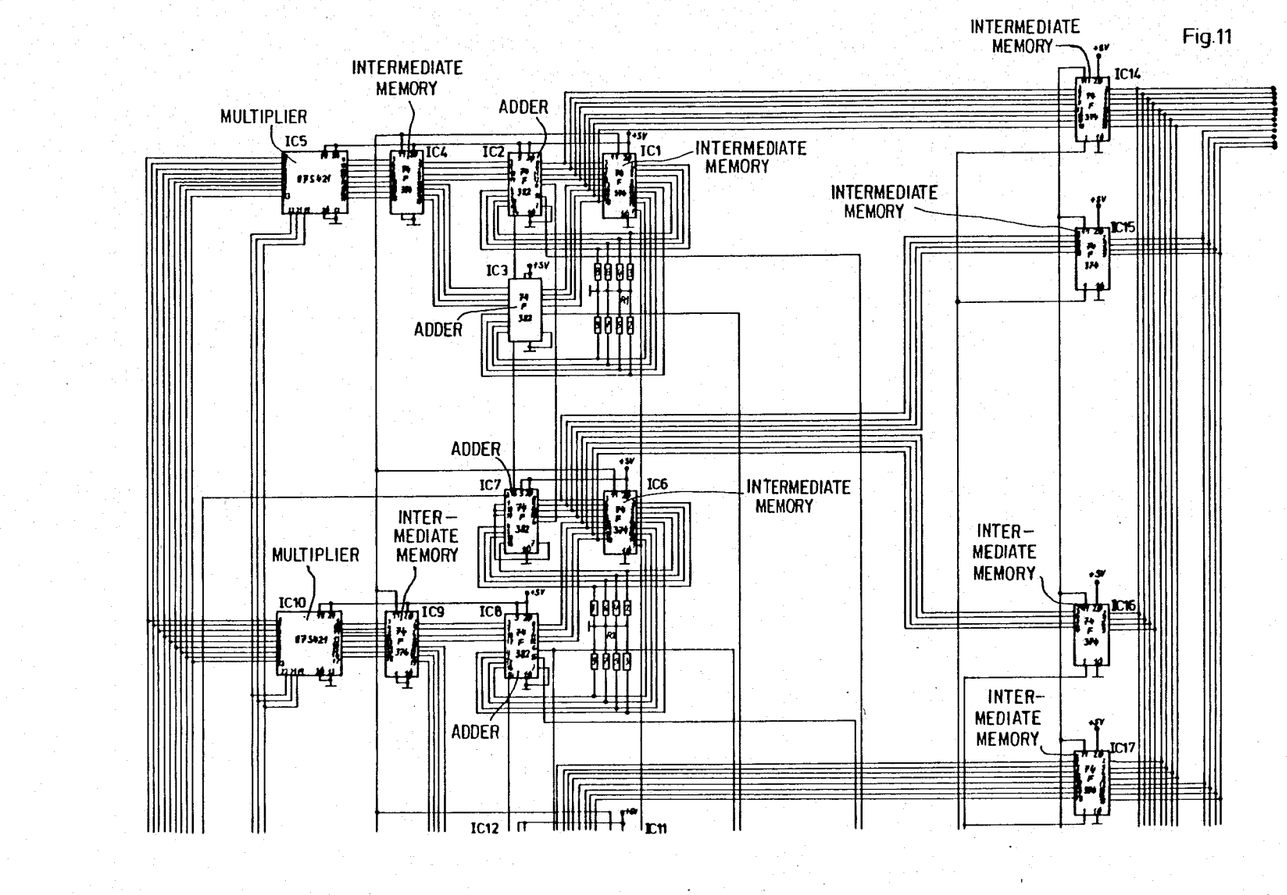
FIGS. 11-16 show a detailed circuit diagram.
Figure 12:
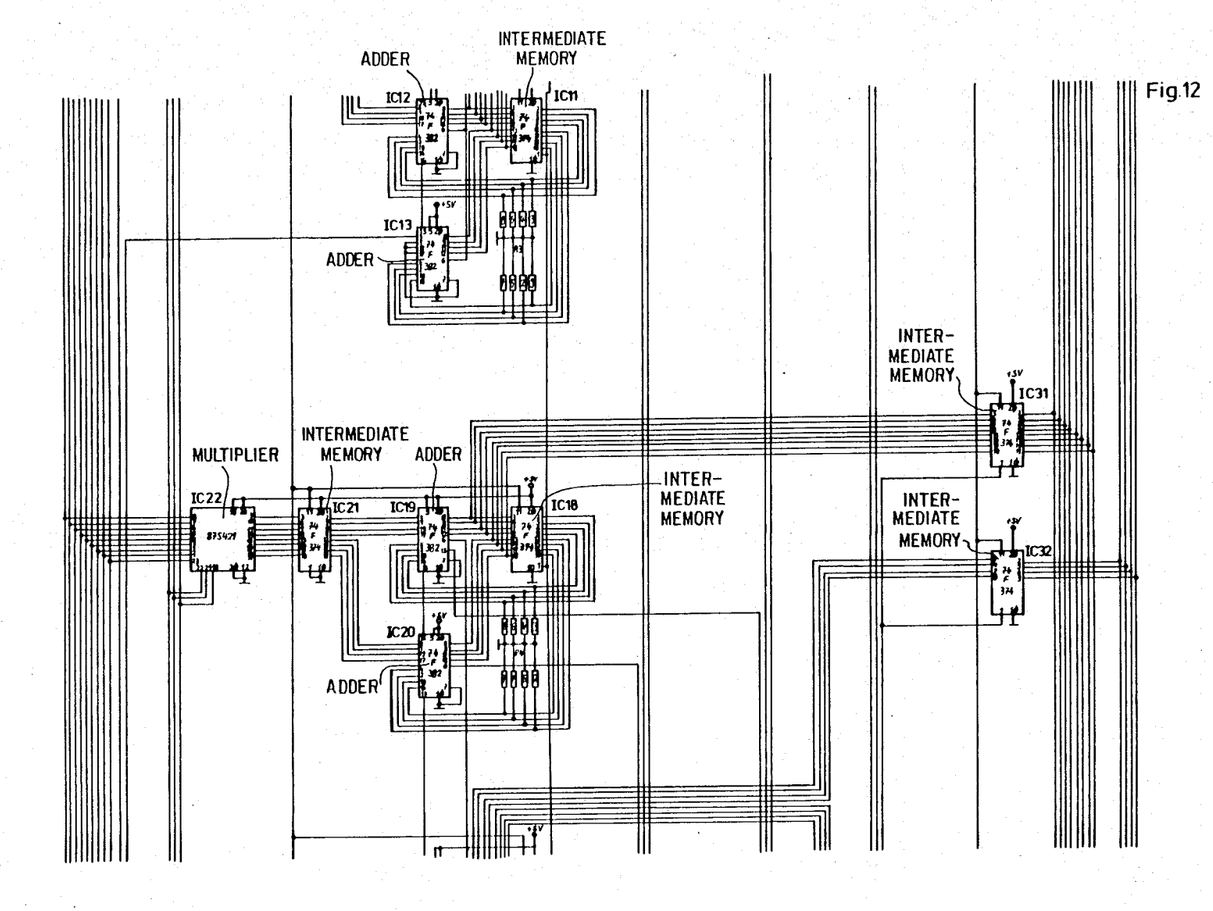
Figure 13:
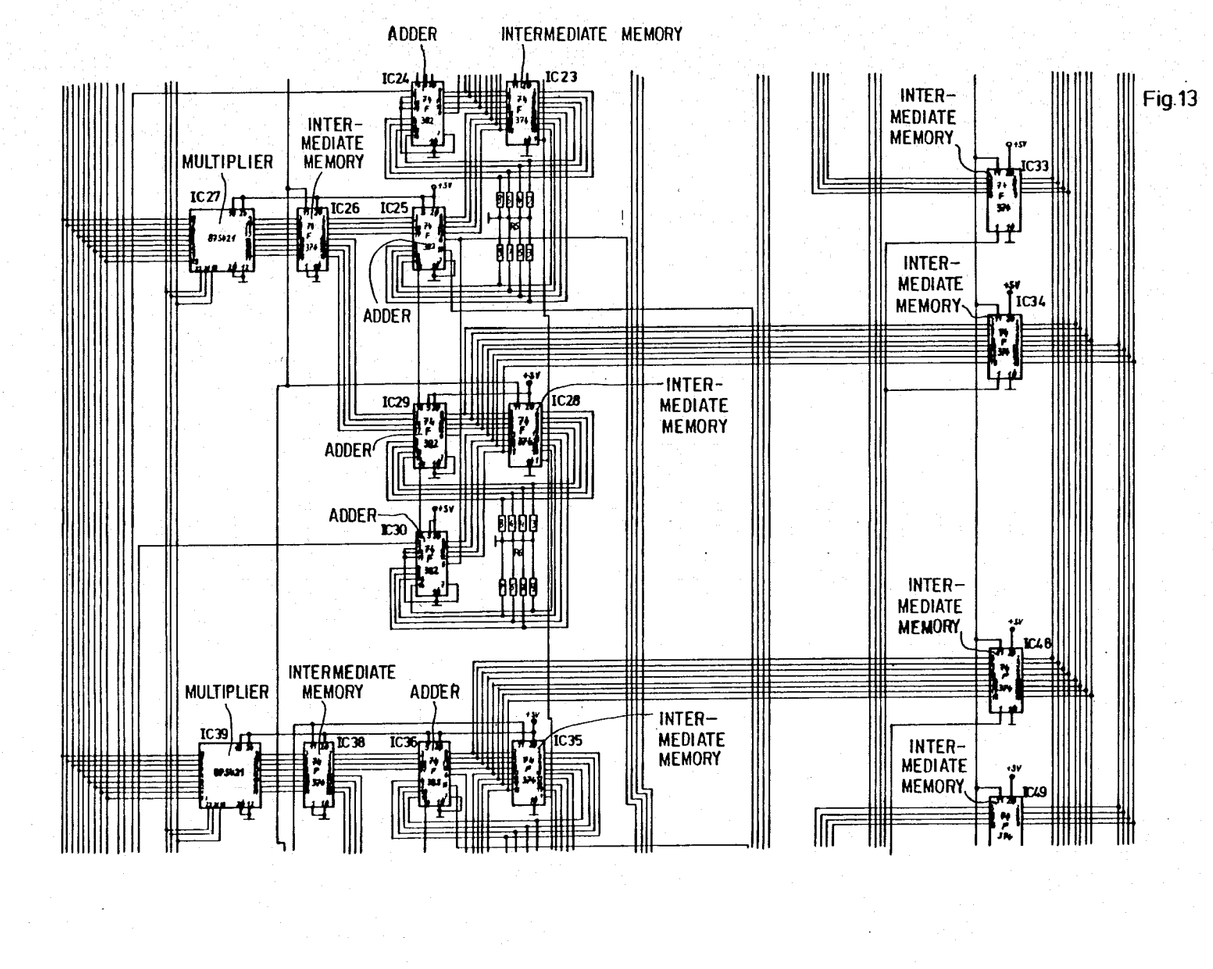
Figure 14:
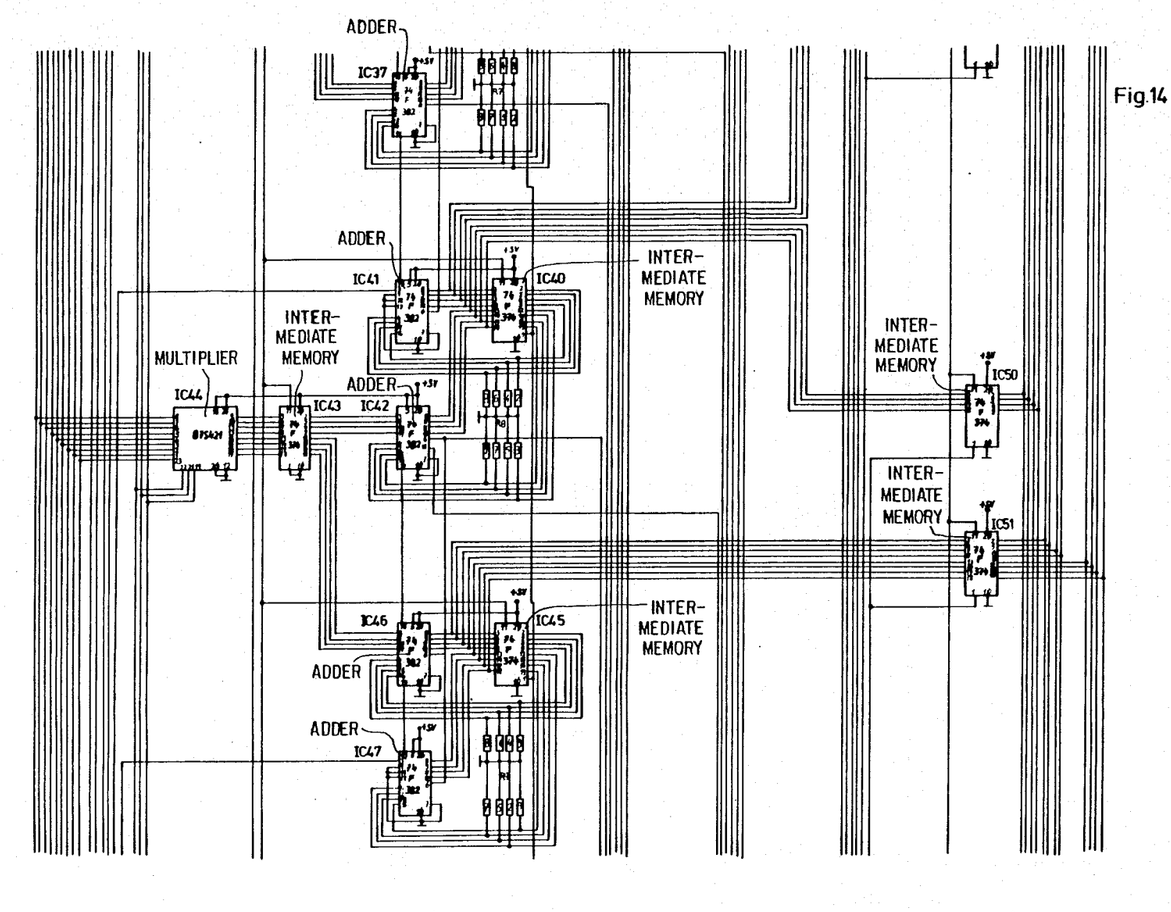
Figure 15:
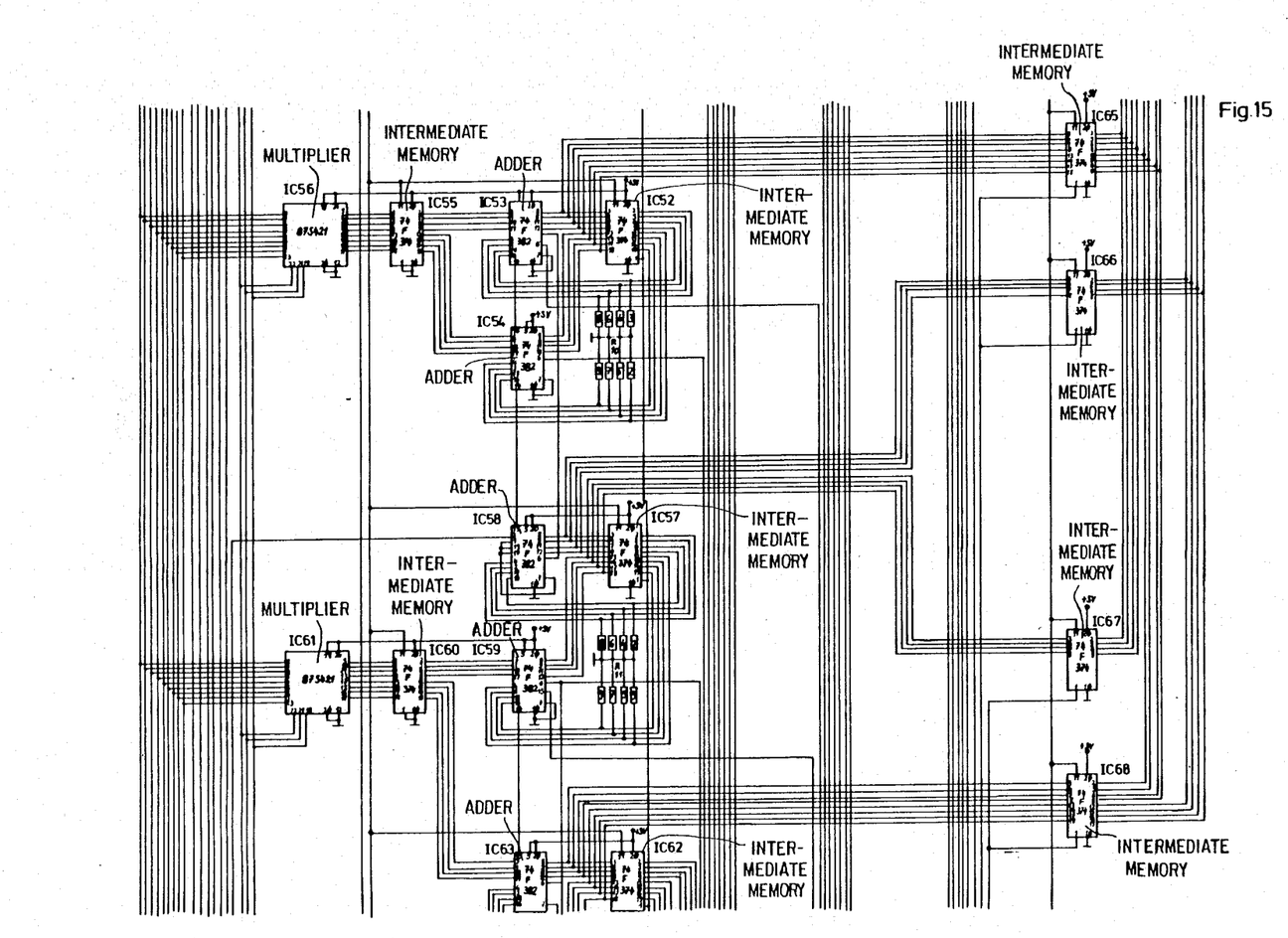
Figure 16:
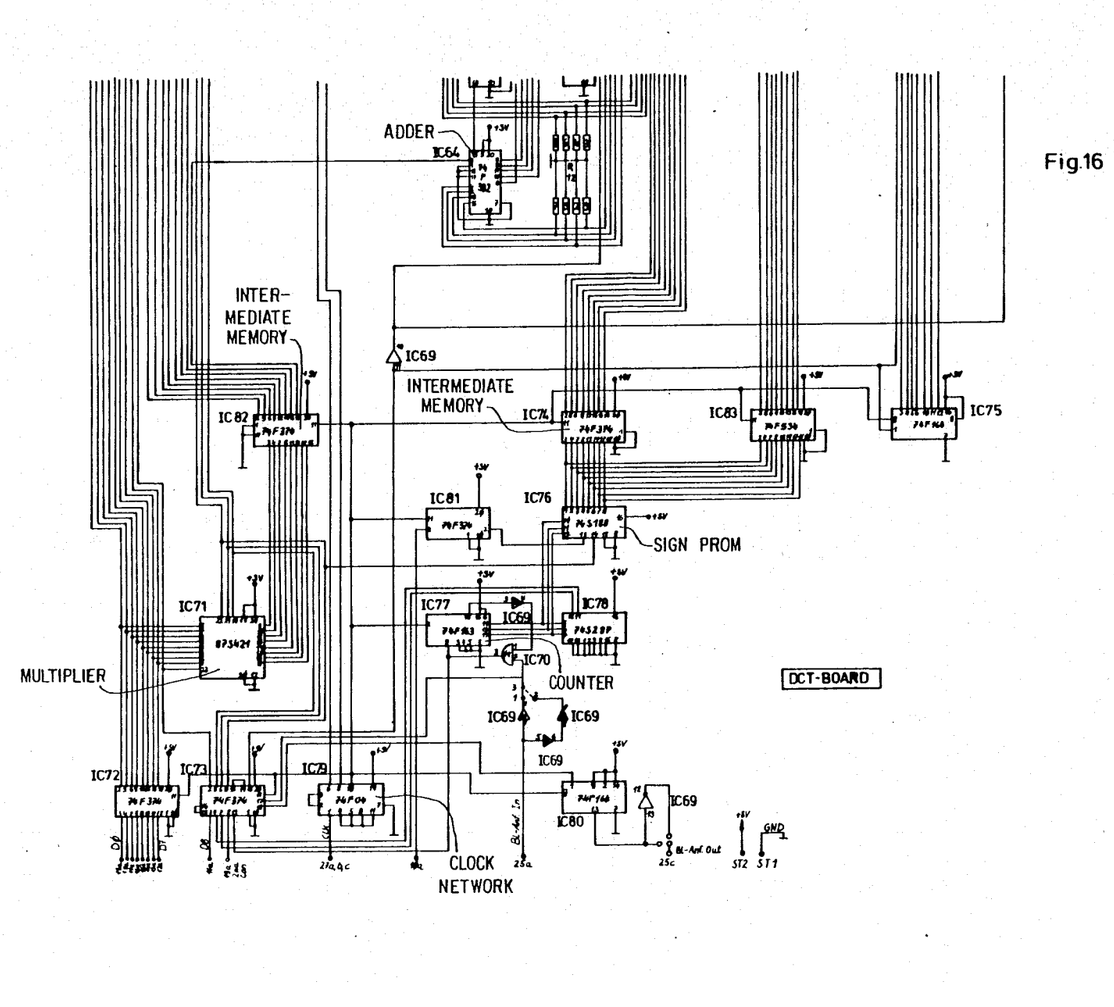

FIG. 10 shows a motion detector equipped with intermediate memories 37 and 38 which store gray or chromaticity values from the block and its edge of the frame (Bn) current in time and of the frame (Bn-1) preceding it in time. Calculating mechanism 39 adds the amounts of the gray or chromaticity differences of the pixels at the edges of the block from the current frame and from the preceding frame. The sum is a measure of the movement of the block content over time. Intermediate memories 37 and 38, as well as the other intermediate memories 30, 32, 34 may be formed by a static RAM 2k8 CY7C128 made by Cypress Semiconductor. The general configuration of the calculating mechanisms and the structure detection circuits and the interpolation circuits which are calculating mechanisms as well, is described in the book entitled "Das TTL Kochbuch" [The TTL Cookbook] by Texas Instruments.

The present disclosure relates to the subject matter disclosed in German P 35 35 178.0 of Oct. 2nd, 1985, and German P 36 08 917.6 of Mar. 18th, 1986, the entire specifications of which are incorporated herein by reference.

It will be understood that the above description of the present invention is susceptible to various modifications, changes and adaptations, and the same are intended to be comprehended within the meaning and range of equivalents of the appended claims.

What is claimed is:

1. In a method of correcting television signals transmitted in frames each having a plurality of fields composed of block wherein each block is constituted by a matrix of pixels defining gray or chromaticity values, some of which values are in error, rendering the block defective, the method including: detecting a defective block by means of an error detection circuit; and reducing the effect of errors in a defective block with an error concealment circuit which is activated by the error detection circuit when a defective block is detected, the improvement wherein:

said reducing step includes calculating, for a block detected to be defective, substituted information from one of information contained in blocks in an environment of the defective block and information from a signal preceding in time the signal containing the defective block; and replacing the defective block with the calculated substitute information, wherein said calculating step includes calculating the substitute information recursively from pixels at the borders of the defective block to the interior of such block.

2. Method as defined in claim 1, includes providing a memory for at least three rows of blocks.

3. Method as defined in claim 1, including providing at least one full frame memory for storing a full television frame.

4. Method as defined in claim 1, including providing a calculating mechanism.

5. In a method of correcting television signals transmitted in frames each having a plurality of fields composed of blocks wherein each block is constituted by a matrix of pixels defining gray or chromaticity values, some of which values are in error, rendering the block defective, the method including: detecting a defective block by means of an error detection circuit; and reducing the effect of errors in a defective block with an error concealment circuit which is activated by the error detection circuit when a defective block is detected, the improvement wherein:

said reducing step includes calculating, for a block detected to be defective, substitute information from one of information contained in blocks in an environment of the defective block and information from a signal preceding in time the signal containing the defective block; and replacing the defective block with the calculated substitute information, wherein said calculating step includes using the information in the geometrically identical block of the full frame preceding in time the frame containing the defective block as the substitute information for no movement of a slight shift on the order of magnitude of 1 pixel per field relative to the corresponding block of the preceding frame, and, said calculating step includes estimating and inserting spectral coefficients in the block to be replaced a retransformation of the spectral coefficients if there is clearly a discernible movement or a shift of more than 2 pixels per field relative to the corresponding block of the preceding frame.

6. Method as defined in claim 5, wherein said calculating step includes calculating the substitute information according to both said using step and said estimating step and formulating a mixture of the substitute information from said using step and said estimating step according to the percentages of the two movements to create a gradual transition between the solutions for motionless changes and discernible movement.

7. In a method of correcting television signals transmitted in frames each having a plurality of fields composed of blocks wherein each block is constituted by a matrix of pixels defining gray or chromaticity values, some of which values are in error, rendering the block defective, the method including: detecting a defective block by means of an error detection circuit; and reducing the effect of errors in a defective block with an error concealment circuit which is activated by the error detection circuit when a defective block is detected, the improvement wherein:

said reducing step includes calculating, for a block detected to be defective, substitute information from one of information contained in blocks in an environment of the defective block and information from a signal preceding in time the signal containing the defective block; and replacing the defective block with the calculated substitute information, and wherein said calculating step includes effecting a one-dimensional transformation of the pixels of lines and columns adjacent to the defective block into a spectral range, and estimating two-dimensional spectral coefficients of the defective block on the basis of the calculated one-dimensional spectral coefficients, and effecting the estimation of the substitute information from a one-dimensional $1 \times 8$ matrix and from a two-dimensional $2 \times 8$ matrix.

8. In a method of correcting television signals transmitted in frames each having a plurality of fields composed of blocks wherein each block is constituted by a matrix of pixels defining gray or chromaticity values, some of which values are in error, rendering the block defective, the method including: detecting the defective block by means of an error detection circuit; and reducing the effect of errors in a defective block with an error concealment circuit which is activated by the error detection circuit when a defective block is detected, the improvement wherein:

said reducing step includes calculating, for a block detected to be defective, substitute information from one of information contained in blocks in an environment of the defective block and information from a signal preceding in time the signal containing the defective block; and replacing the defective block with the calculated substitute information, and wherein, if an edge is in a defective block, said calculating step includes calculating the edge at the geometrically identical block of the frame preceding the defective or concealed block, and if the edge is disposed in a nondefective block, said calculating step includes calculating the edge from the geometrically adjacent block of the current frame.

9. In a method of correcting television signals transmitted in frames each having a plurality of fields composed of blocks wherein each block is constituted by a matrix of pixels defining gray or chromaticity values, some of which values are in error, rendering the block defective, the method including: detecting a defective block by means of an error detection circuit; and reducing the effect or errors in a defective block with an error concealment circuit which is activated by the error detection circuit when a defective block is detected, the improvement wherein:

said reducing step includes calculating, for a block detected to be defective, substitute information from one of information contained in blocks in an environment of the defective block and information from a signal preceding in time the signal containing the defective block; and replacing the defective block with the calculated substitute information, and wherein said calculating step includes using information in a geometrically identical block of the full television frame preceding in time the frame containing the defective block as the substitute information for a shift without motion or a small shift on the order of magnitude of one pixel per field, and said calculating step includes estimating the chromaticity or gray values for the block to be replaced by interpolation beginning at the block edges for distinct movement or a shift of more than two pixels per field.

10. Method as defined in claim 9, wherein said calculating step includes determining the direction of a structure in a block by means of at least one direction detector.

11. Method as defined in claim 10, wherein said calculating step includes using matching pixels at the borders of a defective block corresponding to the direction in the block for the interpolation.

12. Method as defined in claim 10, wherein said determining step includes determining horizontal, vertical, diagonally ascending and diagonally descending directions.

13. Method as defined in claim 10, wherein said calculating step includes utilizing all pixels adjacent a block for the interpolation of the gray or chromaticity values if no unequivocal direction can be determined.

14. Method as defined in claim 10, wherein said calculating step includes superposing an artificially generated structure on the calculated interpolation if no structure direction can be detected and the sum of the output signals of the direction detectors exceeds a threshold value.

15. Method as defined in claim 14, wherein said superposing step includes generating the artificially generated structure from a random number generator.

16. Method as defined in claim 10, wherein said calculating step includes summing absolute values of pixel differences as a measure of probable structure direction.

17. Method as defined in claim 16, wherein said calculating step includes forming the differences of chromaticity or gray values of adjacent pixels of a defective block according to the structure direction detected in the defective block.

18. Method as defined in claim 10, wherein said calculating step includes forming differences of chromaticity or gray values of adjacent pixels in a defective block, which pixels lie on a line perpendicular to the detected structural direction, and of the average gray or chromaticity value of the pixels lying on the line.

* * * * *